United States Patent [19]

Roberts et al.

[11] Patent Number: 4,950,587
[45] Date of Patent: Aug. 21, 1990

[54] J-AGGREGATING DYE POLYMERS AS SPECTRAL SENSITIZERS FOR SILVER HALIDE PHOTOGRAPHIC COMPOSITIONS

[75] Inventors: Michael R. Roberts; Derrick C. Tabor, both of Rochester; Paul B. Gilman, Penfield, all of N.Y.

[73] Assignee: Eastman Kodak Company, Rochester, N.Y.

[21] Appl. No.: 239,864

[22] Filed: Sep. 2, 1988

[51] Int. Cl.$^5$ .......................... G03C 1/12; G03C 1/29
[52] U.S. Cl. .................................. 430/570; 430/574; 430/578; 430/581
[58] Field of Search ................ 430/570, 574, 578, 581

[56] References Cited

U.S. PATENT DOCUMENTS

| | | | |
|---|---|---|---|
| 2,425,772 | 8/1947 | Wilson | 260/240 |
| 3,622,317 | 11/1971 | Bird et al. | 96/1.7 |
| 3,976,493 | 8/1976 | Borror et al. | 96/128 |

Primary Examiner—Paul R. Michl
Assistant Examiner—Thorl Chea
Attorney, Agent, or Firm—Paul L. Marshall

[57] ABSTRACT

Dye polymers are disclosed that J-aggregate in solution and when adsorbed to silver halide. These polymers comprise polymer repeat units having covalently bonded thereto cyanine dye units comprising two benzimidazole nuclei, in an amount sufficient to J-aggregate.

4 Claims, 1 Drawing Sheet

J-AGGREGATING DYE POLYMERS AS SPECTRAL SENSITIZERS FOR SILVER HALIDE PHOTOGRAPHIC COMPOSITIONS

FIELD OF THE INVENTION

This invention relates to sensitizing dyes for photographic compositions, specifically to J-aggregating dye polymers useful for sensitizing silver halide in photographic compositions.

BACKGROUND OF THE INVENTION

Spectral sensitization of silver halide in photographic compositions is generally accomplished by adsorption of sensitizing dye molecules to the surface of silver halide grains. The dye molecules absorb energy of a certain wavelength and transfer that energy to the silver halide, causing formation of a latent image. For many applications, it is highly desirable that the dye that is adsorbed to the surface of the silver halide be in a J-aggregated state. This J-aggregrated state usually imparts to the dyes desirable sharp, intense absorbance, and also increases the efficiency with which the dyes absorb light and spectrally sensitize the silver halide, relative to non-aggregated dyes.

The situation generally regarded as providing maximum sensitization is coverage of the sensitizable surface of the silver halide grain with a layer of sensitizing dye the thickness of a single molecule, the so-called monolayer coverage. If this limit is exceeded and more dye is loaded onto the silver halide grain, creating a multimolecular-thick layer of the same sensitizing dye, photographic speed losses occur. These speed losses may arise from competing light absorption, which may occur when the outer dye molecules absorb energy from light of the wavelength to which it is desired to sensitize the silver halide, but due to their distance from the grain and the presence of other dye molecules interspaced between the outer dye molecules and the surface of the silver halide grain, they do not transfer energy to create the latent image. The dye molecules directly adsorbed to the surface of the silver halide, while capable of transferring energy to the silver halide, are not able to absorb all of the light energy due to this competition. Another common limitation of the amount of dye that may be adsorbed to silver halide emulsion grains is due to dye-induced desensitization. Desensitization occurs by a mechanism where the adsorbed dye traps photoholes and then releases the holes, which attack latent image centers. In actual practice, the onset of desensitization occurs when the dye coverage exceeds about 30% monolayer coverage.

It has been speculated that attaching sensitizing dye molecules to, or incorporating them in a polymer backbone could allow for amounts of sensitizing dye greater than that representing monolayer coverage to be loaded onto silver halide grains. Theoretically, higher spectral sensitivity from increased light absorption could be obtained utilizing a dye polymer than with adsorbtion of individual dye molecules onto the surface of the silver halide grain.

A significant problem with previous attempts to utilize polymeric sensitizing dyes has been their inability to attain the desireable state of J-aggregation when adsorbed to silver halide. While the exact cause of this inability to J-aggregate is not known, the discovery of the present invention indicates that it may be due to the lack of proper orientation of the dye molecule units to each other in the polymer molecule or to an insufficient proportion of dye molecule units relative to the polymer repeat unts, resulting in insufficient overlap of $\pi$ orbitals of the dye molecules to achieve J-aggregation.

U.S. Pat. No. 2,393,351 discloses polymeric sensitizing dyes for photographic emulsions containing two dye nuclei linked through heterocyclic nitrogen atoms by a polyvalent hydrocarbon radical having an acyclic carbon atom attached to the nitrogen atoms. These dye polymers, with the dye molecules as part of the polymer backbone repeat unit, are unable to J-aggregate on the silver halide due to the relative orientation of the dye molecule units to each other. It is postulated that because of their orientation to each other as part of the polymer backbone, the dye molecules do not achieve the $\pi$ orbital overlap believed to be necessary for J-aggregation (see James, *The Theory of the Photographic Process 4th*, pp. 218-222, 1977).

J-aggregation of dye polymers has been achieved through ionic complexing of the dye molecule and the polymer (e.g., R. Bean, W. Shepard, R. Kay, & E. Walurck, J. Phys. Chem, 69 (12), 4368 (1965); however, these dye polymers have not been successfully used to spectrally sensitize silver halide. Because of competing ionic interactions and/or weak binding, the adsorption of these complexed dye polymers onto silver halide cannot be adequately controlled. Often, in the process of adding the complexed dyes to silver halide, the aggregates disassemble and behave like free dye.

SUMMARY OF THE INVENTION

According to the present invention, dye polymers that J-aggregate when adsorbed to silver halide have been discovered. These polymers comprise a coiled polymer backbone having covalently bonded thereto cyanine dye units, each comprising two benzimidazole nuclei, in an amount sufficient to J-aggregate when the dye polymer is adsorbed to the surface of the silver halide. It is believed that the combination of the conformation of the polymer backbone and the loading onto the backbone of dye units in amounts heretofore not achieved allows for significant enough overlap of the dye units to achieve the desirable J-aggregated state.

In one embodiment of the invention, the dye polymers are prepared by polymerizing monomers having sites capable of reacting with a benzimidazole-containing dye intermediate. The backbone is then reacted with a first benzimidazole-containing cyanine dye intermediate to covalently bond the dye intermediate to the backbone. Then, the resulting backbone/dye intermediate compound is reacted with a second benzimidazole-containing dye intermediate that covalently bonds to the first dye intermediate to form a dye unit that is covalently bonded to the polymer backbone.

DESCRIPTION OF THE PREFERRED EMBODIMENTS

Figure 1:
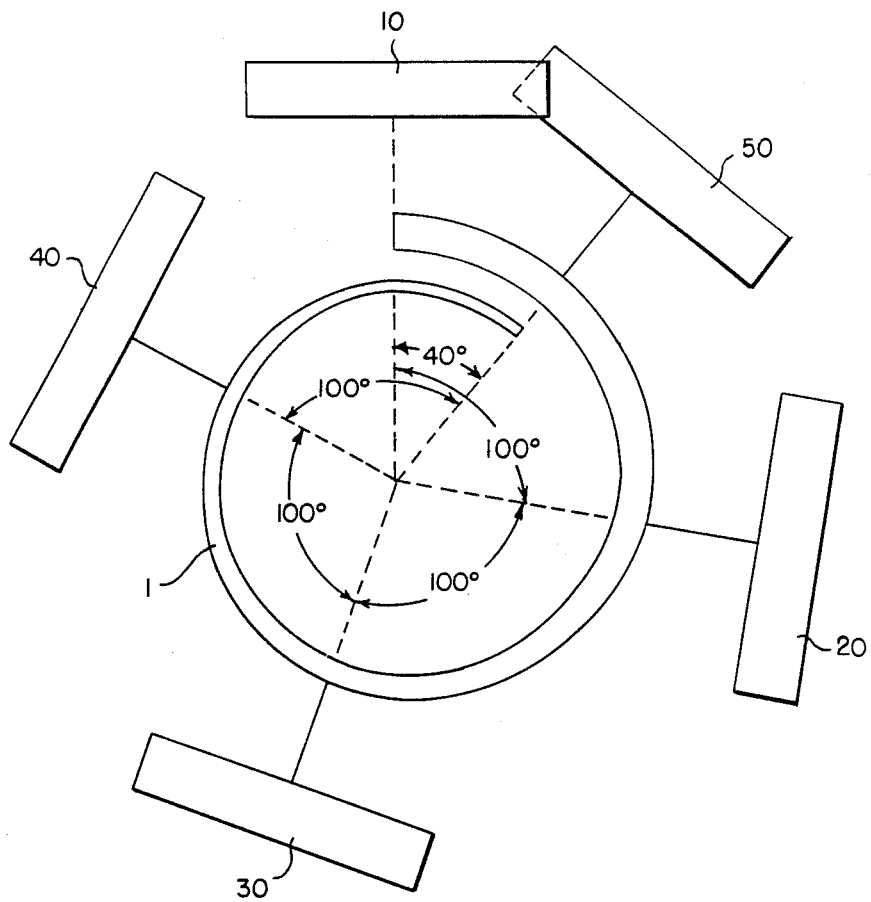
FIG. 1 represents an end-view of a section of a dye polymer for use in the invention comprising an $\alpha$ helix polymer backbone with dyes appended thereto.

The polymer backbone of the dye polymer of the invention can be any of a number of known polymer backbones. It may be a randomly coiled backbone, such as poly(2-aminoethyl methacrylate), poly(3-aminopropyl methacrylamide), or copolymers thereof. It may also be a helical coiled backbone as is found in polyaminoacids, such as poly(l-lysine), poly(l-ornithine, and others described in, for example, H. Law, *The Organic Chemistry of Peptides*, 1950, J. Wiley & Sons,; G. Fasman, *Poly α-Amino Acids*, 1967, Marcel Dekker, Inc.; G. Zubay, *Biochemistry*, 1983, Addison Wesley Publ. Co.; E. Selegny, *Optically Active Polymers*, 1979, D. Reidel Publishing; or R. B. Martin, *Introduction to Biophysical Chemistry*, 1964, McGraw Hill, Inc. The size of the polymer backbone is preferably from 10 to 10,000 repeat units.

The exact conformation of the coiled polymer backbone will depend on the dye that is to be bonded thereto. Referring to FIG. 1, there is shown an end-view of a section of an α helix polymer backbone 1, as might be observed for poly(l-lysine). Dyes 10, 20, 30, 40, and 50, respectively, represent successive dye units attached to adjacent polymer backbone repeat units. The dihedral angle between adjacent dye units is 100°. It can be seen from FIG. 1 that dye 10 and dye 50 have a dihedral angle of separation of 40°, which allows for enough overlap of the dye units to induce J-aggregation. In FIG. 1, there are three intervening polymer backbone repeat units between the units having dyes 10 and 50 bonded thereto. The dye molecule and the polymer repeat unit are chosen so that the distance between dyes having the proper dihedral angle of separation is short enough to allow for overlap between dyes 10 and 50.

The dye units of the dye polymer of the invention can be any cyanine sensitizing dye having two benzimidazole nuclei. The dyes are preferably those that would J-aggregate when adsorbed to a silver halide substrate from solutions of the dye in the molecular (not polymeric) state. Such dyes are generally of the formula:

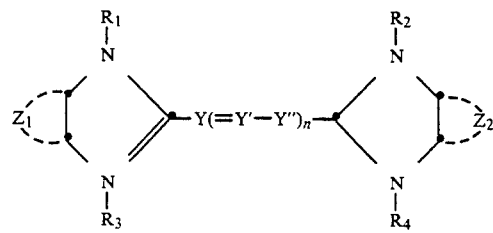

where Y, Y', and Y" each independently represents a substituted or unsubstituted methine group, $Z_1$ and $Z_2$ each independently represents a substituted or unsubstituted 5- or 6-membered ring, n is an integer as known in the art for the above formula to form a cyanine sensitizing dye, and $R_1$, $R_2$, $R_3$, and $R_4$ each independently represents substituted or unsubstituted alkyl of from 1 to 6 carbon atoms. Each of Y, Y', Y", $Z_1$, $Z_2$, $R_1$, $R_2$, $R_3$, or $R_4$ may be substituted by any of a number of substituents known for such groups. These include alkyl of 1 to 6 carbon atoms such as methyl or ethyl, aryl of from 6 to 20 carbon atoms such as phenyl, halogen such as chloro, alkoxy of 1 to 15 carbon atoms such as methoxy, ethoxy, as well as sulfo, carboxyl, and other substituents that do not prevent the dyes from J-aggregating and sensitizing silver halide. $Z_1$ and $Z_2$ may also be substituted with atoms to form fused ring systems, such as benzyl or naphthyl. One of $R_1$, $R_2$, $R_3$, or $R_4$ is advantageously linked through a linking group such as amide or ester so as to covalently bond with the chiral polymer backbone to form the dye polymer of the invention.

The chemistry of cyanine and related dyes, including methods of making them, is described by Weissberger and Taylor, *Spectral Topics of Heterocyclic Chemistry*, John Wiley and Sons, New York, 1977, Chapter VIII; Venkataraman, *The Chemistry of Synthetic Dyes*, Academic Press, New York, 1971, Chapter V; James, supra, Chapter 8, and F. M. Hamer, *Cyanine Dyes and Related Compounds*, John Wiley and Sons, New York, 1964. Useful sensitizing dyes include the benzimidazole dyes disclosed in UK Pat. No. 742,112, Brooker U.S. Pat. Nos. 1,846,300, '301, '302, '303, '304, 2,078,233, and 2,089,729, Brooder et al U.S. Pat. Nos. 2,165,338, 2,213,238, and 2,493,747, '748, 2,526,632, 2,739,964 (Reissue 24,292), 2,778,823, 2,917,516, 3,352,857, 3,411,916, and 3,431,111, Sprague U.S. Pat. No. 3,503,776, Nys et al U.S. Pat. No. 3,282,933, Riester U.S. Pat. No. 3,660,102, Kampfer et al U.S. Pat. No. 3,660,103, Taber et al U.S. Pat. Nos. 3,335,010, 3,352,680, and 3,384,486, Lincoln et al U.S. Pat. No. 4,397,981, Fumia et al U.S. Pat. Nos. 3,482,978, and 3,623,881, Spence et al U.S. Pat. No. 3,718,470, and Mee U.S. Pat. No. 4,025,349.

The sensitizing dye is covalently bonded to the polymer backbone through any atoms capable of forming such bonds. This bonding may be direct or through any known linking group. It is within the skill of the art to determine the optimum bonding configuration of a particular dye molecule and polymer backbone. Generally, the strongest covalent bonds between the dye and the polymer backbone will be formed through a heteroatom, such as the nitrogen atom of a benzimidazole nucleus of the dye.

The optimum amount of dye covalently bonded to the polymer backbone will vary according to the polymer backbone, the dye, the silver halide being sensitized, and the desired performance characteristics of the photographic element in which they are being used. One skilled in the art can easily determine the optimum amount of dye for a specific purpose by simple experimental techniques using varying amounts of dye.

In a preferred embodiment of the invention, the dye polymers described above comprise repeating units of the formula:

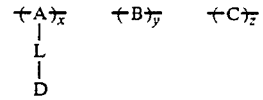

wherein A and B each independently represents chiral polymerized monomers, C is one or more other polymerized monomers, L is a linking group of 4 to 15 carbon atoms, D is one or more dyes capable of spectrally sensitizing silver halide, x represents a mole percent of 10 to 100%, y represents a mole percent of 0 to 50%, and z represents a mole percent of 0 to 50%.

The polymer backbone repeat units useful as —A—, —B—, AND —C— can be any units derived from monomers capable of addition or condensation polymerization. Such monomers include amino acids, such as lysine and ornithine, or ethylenically unsaturated monomers, such as acrylic and methacrylic acid esters (e.g., methyl methacrylate, methyl acrylate, ethyl methacrylate, n-butyl acrylate, 2-ethylhexyl methacrylate, 2-hydroxyethyl methacrylate, 2-hydroxyethyl acrylate, ethylene dimethacrylate, methacrylamide, acrylamide, methyl acrylamide, methyl methacrylamide, acrylonitrile, and the like), styrene and styrene derivatives (e.g., vinyl toluene, vinylbenzene, divinylbenzene, 4-t-butylstyrene, 2-chloromethylstyrene, and the like), vinyl ethers, vinyl esters, and maleic anhydride. The —A— unit is preferably a polymerized monomer that has a pendant amino or hydroxyl group for linking with the dye D. Such monomers having pendant amino groups include lysine, vinyl amine, 2-aminoethyl methacrylate, 3-aminopropylmethacrylamide, and the like.

The linking group, L, can be any known linking group, such as substituted or unsubstituted alkyl, substituted or unsubstituted aryl, or substituted or unsubstituted alkenyl, preferably of from 4 to 15 carbon atoms. In a preferred embodiment, —L— is represented by the formula —$R_5$—L'—$R_6$—. In this formula $R_5$ and $R_6$ are each independently substituted or unsubstituted alkyl of from 1 to 10 carbon atoms. L' is a linking group resulting from a substitution reaction (e.g., utilizing a nucleophile such as amino, hydroxy, alkoxy, alkylthio, and the like), an addition reaction (e.g., a Michael addition such as a reaction between an activated unsaturated group such as a vinyl sulfonyl or acryloyl with an active methylene group such as —CO—$CH_2$—CO—$CH_3$ or —CO—$CH_2$—CN), or a condensation reaction (e.g., the reaction of an amine or alcohol with a carboxylic acid or ester). These reactions may be between hydroxy compounds or amines, and isocyanates, carboxylic acids, carboxylic acid esters, carboxylic acid halides, carboxylic acid anhydrides, sulfonic acids, sufonic acid esters, or sulfonic acid halides. Examples of L' linkages include an ester (e.g., —$(CH_2)_2$—$CO_2$—$(CH_2)_2$—), amido (e.g., —$(CH_2)_3$—CO—NH—$(CH_2)_2$—), imido (e.g., —$(CH_2)_4$—N=CH—$(CH_2)_4$—), urethane (e.g., —$(CH_2)_5$—O—CO—NH—$(CH_2)_5$—), sulfonamido (e.g., —$(CH_2)_3$—$SO_2$—NH—$(CH_2)_3$—), or carbonate (e.g., —$(CH_2)_2$—O—CO—O—$(CH_2)_4$—).

The formation of L linkages is further described in Table I below:

The sensitizing dye, D, can be any of the sensitizing dyes described above that are capable of J-aggregating when covalently bonded to the polymer backbone. In a preferred embodiment, —D is represented by the formula —D'—D", where D' is a benzimidazole dye intermediate capable of bonding with a side chain of the polymer backbone to form the linking group L and D" is a benzimidazole dye intermediate capable of bonding to D'. Examples of —D' include:

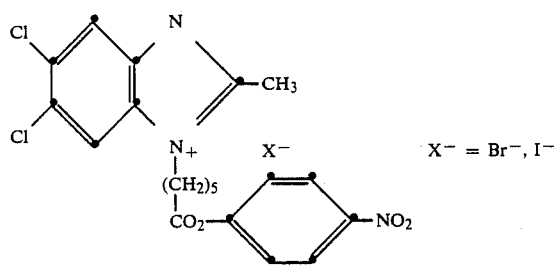

Examples of —D" include:

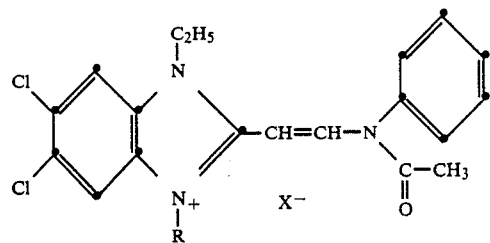

where $X^-$ is $I^-$, $Br^-$, or p-toluene sulfonate and R is ethyl, methyl, propyl, butyl, pentyl, hexyl, heptyl, nonyl, decyl, —$(CH_2)_4$—N—$(C_2H_5)_3^+$ $Br^-$, or —$(CH_2)_5$—N—$(C_2H_5)_3^+$ $Br^-$.

Additional examples of such dye intermediates and how they are incorporated in the dye polymer are shown in the Examples below.

The dye polymer useful in this invention can be prepared by:

(1) treating a benzimidazol-containing dye intermediate having an active site with an alkylating agent having a substituent capable of undergoing a condensation, substitution or addition reaction, or having a group capable, upon activation, of undergoing a condensation, substitution, or addition reaction, to generate a quaternary ammonium salt intermediate, (2) activating, if necessary, and linking this quatenary ammonium salt intermediate with a chiral polymer having a complementary group that will undergo a substitution, addition, or condensation reaction with the intermediate of step (1), (3) reacting the polymer of step 2 with a second benzimidazole-containing dye intermediate capable of bonding to the dye intermediate of step (1) to form a dye unit that can sensitize silver halide.

The active site on the heterocyclic compound of step (1) is preferably a heterocyclic nitrogen. The group capable of activation in step (1) is preferably an acid group, which can be activated to an acid halide or a nitrophenyl ester as described in S. Sakibara and N. Inukai, Bull. Chem. Soc. Japan, 37, 1231 (1964). The quaternary ammonium salt intermediate from step 1, then, has two active or activatable sites. One is the 2-methyl group on the heterocyclic ring and the other is an activated ester on the side chain attached to the heterocyclic nitrogen or an activatable (as described above) carboxylic acid on the side chain attached to the heterocyclic nitrogen. Thus, the activation in step 2 is necessary if the quaternary ammonium salt intermediate has an acid group in the side chain attached to the heterocyclic nitrogen. The complementary group of step 2 is preferably hydroxy, mercapto, or an amine group. The dye intermediate of step (3) preferably contains an acetanilidovinyl group on its heterocyclic nucleus to condense with an active methylene group on the dye intermediate of step one to form a methine chain linking the two heterocyclic nuclei.

In an alternative embodiment, the dye unit containing the two benzimidazole nuclei and having, on one of the nuclei, a substituent capable of undergoing a condensation, substitution or addition reaction, or having a group capable, upon activation, of undergoing a condensation, substitution, or addition reaction, can be formed first. This dye unit may then be reacted with a chiral polymer having a complementary group that will undergo a substitution, addition, or condensation reaction with the active or activatable group on this dye unit.

An example of the reaction scheme used to prepare a typical dye polymer useful in the invention is shown in the Examples below.

The dye polymers useful in the practice of the invention can be used to sensitize silver halide in essentially any known form, such as conventional silver halide and gelatin emulsions as described in *Research Disclosure*, Item 17643, Dec. 1978 [hereinafter referred to as *Research Disclosure I*], tabular grain silver halide and gelatin emulsions as described in *Research Disclosure*, Item 22534, Jan., 1983, and pure silver halide such as vacuum deposited silver halide layers or degelled silver halide grains. For spectral sensitization of silver halide and gelatin emulsions, it is especially useful to dissolve the dye polymer in a polar organic solvent, such as methanol, and then add the dye solution to an aqueous emulsion of water, polar organic solvent (e.g., methanol), gelatin, and silver halide grains.

The dye polymer useful in the practice of the invention may be used by itself to sensitize silver halide, or it may be used in combination with any known polymeric sensitizing dyes or non-polymeric sensitizing dyes. Such combinations may provide the silver halide with sensitivity to broader or different ranges of wavelengths of light than silver halide sensitized with a single dye polymer. Combinations of polymeric dyes, non-polymeric dyes, or both, may also be utilized to provide supersensitization of the spectrally sensitized silver halide.

In a preferred embodiment of the invention, the dye polymers of the invention are used to spectrally sensitize silver halide in photographic emulsions, which can be coated as layers on photographic elements. The amount of dye units appended to polymer backbones in the emulsion can be any amount that is known in the art to be useful for spectral sensitization. The amount would normally be chosen on the basis of the number of moles of dye units per mole of silver halide, which should range from 0.1 to 2.0 mmoles/mole Ag. Optimum dye concentrations can be determined by methods known in the art, with the understanding that the dye polymer of the invention can be used in amounts greater than prior art nonpolymeric dyes (on a moles of dye units per mole of silver halide basis) with less dye-induced desensitization.

Photographic emulsions generally include a vehicle for coating the emulsion as a layer of a photographic element. Useful vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), gelatin derivatives (e.g., acetylated gelatin), phthalated gelatin, and the like), and others as described in *Research Disclosure I*. Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers, and the like, as described in *Research Disclosure I*. The vehicle can be present in the emulsion in any amount known to be useful in photographic emulsions.

The emulsion can also include any of the addenda known to be useful in photographic emulsions. These include chemical sensitizers, such as active gelatin, sulfur, selenium, tellurium, gold, platinum, palladium, iridium, osmium, rhenium, phosphorous, or combinations thereof. Chemical sensitization is generally carried out at pAg levels of from 5 to 10, pH levels of from 5 to 8, and temperatures of from 30° to 80° C., as illustrated in Research Disclosure, June, 1975, item 13452 and U.S. Pat. No. 3,772,031.

Other addenda include brighteners, antifoggants, stabilizers, filter dyes, light absorbing or reflecting pigments, vehicle hardeners such as gelatin hardeners, coating aids, dye-forming couplers, and development modifiers such as development inhibitor releasing couplers, timed development inhibitor releasing couplers, and bleach accelerators. These addenda and methods of their inclusion in emulsion and other photographic layers are well-known in the art and are disclosed in *Research Disclosure I* and the references cited therein.

The emulsion layer containing silver halide sensitized with the dye polymer of the invention can be coated simultaneously or sequentially with other emulsion layers, subbing layers, filter dye laters, or interlayers or overcoat layers, all of which may contain various addenda known to be included in photographic elements. These include antifoggants, oxidized developer scavengers, DIR couplers, antistatic agents, optical brighteners, light-absorbing or light-scattering pigments, and the like.

The layers of the photographic element can be coated onto a support using techniques well-known in the art. These techniques include immersion or dip coating, roller coating, reverse roll coating, air knife coating, doctor blade coating, stretch-flow coating, and curtain coating, to name a few. The coated layers of the element may be chill-set or dried, or both. Drying may be accelerated by known techniques such as conduction, convection, radiation heating, or a combination thereof.

The photographic element of the invention can be black and white or color. A color photographic element generally contains three silver emulsion layers or sets of layers: a blue-sensitive layer having a yellow color coupler associated therewith, a green-sensitive layer having a magenta color coupler associated therewith, and a red-sensitive layer having a cyan color coupler associated therewith. Other element configurations are well-known in the art and are disclosed, for example, in *Research Disclosure I*.

The invention is further illustrated by the following examples.

SYNTHESIS EXAMPLE 1

Preparation of Dye-Polymer 1

Step 1—Preparation of Intermediate A

Caprolactone (11.9 g) was added portionwise to a stirred neat solution of iodotrimethylsilane (21.0 g). After complete addition, the mixture was stirred for another 10 minutes. 1-Ethyl-2-methyl-5,6-dichlorobenzimidazole (23.0 g) was added to the mixture in a single portion. The mixture was then heated over a steam bath for 60 hours under a drying tube. The solid cake that formed was taken up in methanol with heating and the homogeneous solution was allowed to cool slightly and poured into anhydrous ether with precipitation. The precipitate was collected by filtration, dried, and recrystallized from $CH_3CN$ to yield 3-(5-carboxypentyl)-5,6-dichloro-1-ethyl-3-methylbenzimidazolium iodide (intermediate A). The structure was confirmed with mass spectral, ¹H NMR, and infrared spectral analysis.

SYNTHESIS EXAMPLE 2
Preparation of Dye-Polymer 2

Dye-Polymer DP-2

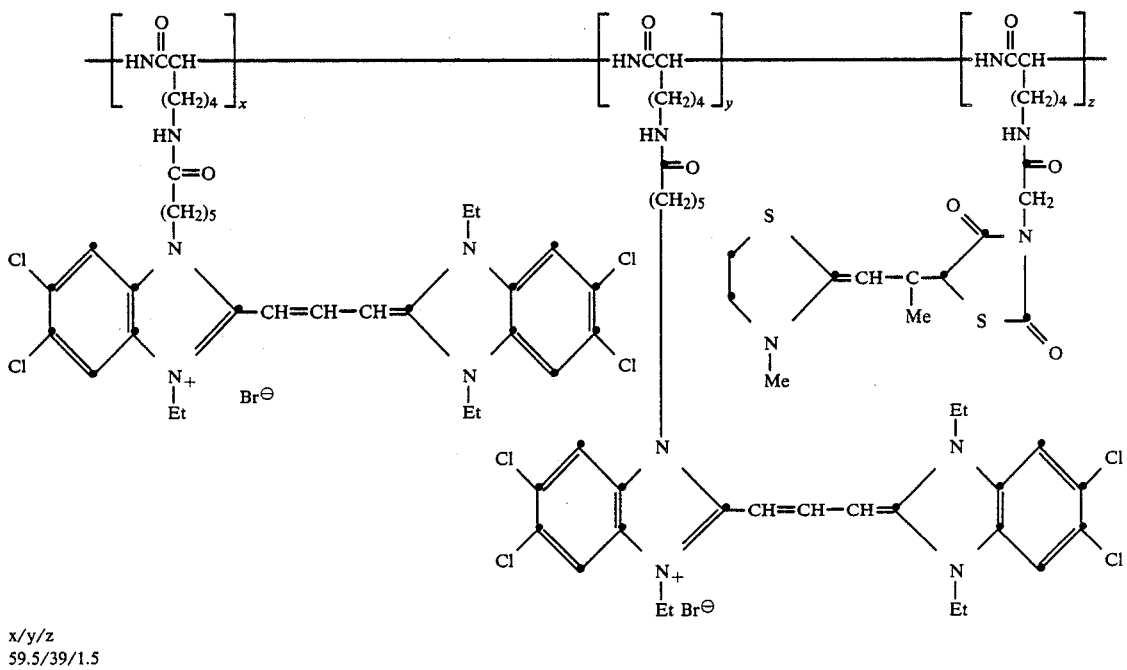

x/y/z
59.5/39/1.5

Step 2—Preparation of Intermediate B

Intermediate A (0.5 g) was dissolved in 5 ml pyridine at room temperature. To this solution was added p-nitrophenyl trifluoroacetate (1.0 g) in a single portion as a melt. The solution was stirred for 1 hour at room temperature and then diluted to 5 times the volume with toluene. The solid precipitate that formed was filtered, washed with toluene, and dried in vacuo to yield 5,6-dichloro-1-ethyl-2-methyl-3-[5-(p-nitrophenyloxycarbonyl)]-pentylbenzimidazolium iodide-co-trifluroacetate (intermediate B).

Step 3—Preparation of Intermediate C

Crude intermediate B (0.65 g) was dissolved in 4.5 ml dimethyl sulfoxide and added to a solution of poly-l-lysine hydrochloride (150 mg) in dimethyl sulfoxide (4 ml) and triethylamine (0.48 ml) at room temperature. The solution was stirred for 1 hour, at which time an additional amount of poly-l-lysine.HCl (0.38 g) in dimethyl sulfoxide (0.2 ml) was added. The mixture was stirred for 18 hours to form a reaction mixture containing intermediate C.

Step 4—Preparation of Dye-Polymer 1

2-(2-Acetanilidovinyl)-5,6-dichloro-1,3-diethylbenzimidazolium iodide (0.68 g) was dissolved in the reaction mixture from step 3 with brief swirling at 60° C. Upon cooling, tetramethylguanidine (0.4 ml) was added. The deep red solution was stirred for 3 hours, at which time dye-polymer 1 was precipitated by pouring the mixture into methanol. Filtration and drying yielded DP-1 (λ-max=580 nm in a 1:20 mixture of dimethylformamide and methanol).

Step 1—Preparation of Intermediate D

Trifluoroacetic anhydride (84 ml, 0.6 mol) was added to a suspension of p-nitrophenol (56 g, 0.4 mol) in toluene (120 ml) in one portion. The mixture was heated at reflux for 5 hrs at which time the p-nitrophenol had fully dissolved. The solvent was then removed by distillation at 20 mm, 40°-50° C. and the yellow residual oil (which contained some toluene) was transferred to a brown bottle flushed with dry N₂. This oil was used directly without further purification; yield 110 g; IR spectrum in agreement with the expected structure, p-nitrophenyl trifluoroacetate.

A merocyanine dye (500 mg, 1.5 mmol) of the formula:

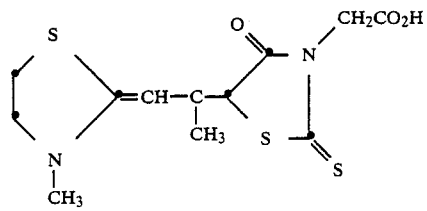

was dissolved in pyridine (50 ml), followed by the addition of p-nitrophenyl trifluoroacetate (0.8 ml of the oil described above). The orange-red solution was stirred overnight. Another aliquot of p-nitrophenyl trifluoroacetate (0.4 ml) was added and the reaction mixture was stirred an additional 3 hrs. The solvent was removed at 2 mm, 30°-40° C. The product was precipitated with toluene/ethanol 1:1, filtered, washed with toluene, and dried in vacuo. Yield, 620 mg, 97%, m.p. 211°-213° C., λ-max 492 nm (MeOH, trace cresol), IR and mass spectrograms in agreement with the expected structure:

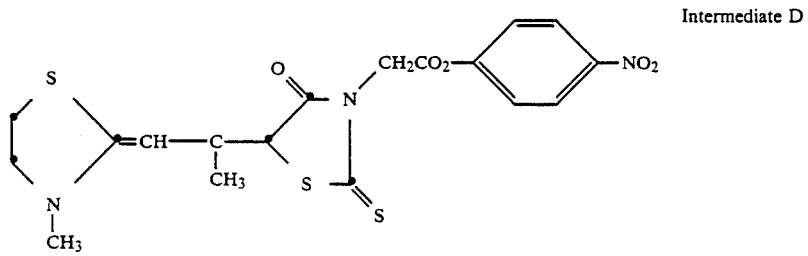

Intermediate D

Step 2—Preparation of Intermediate E

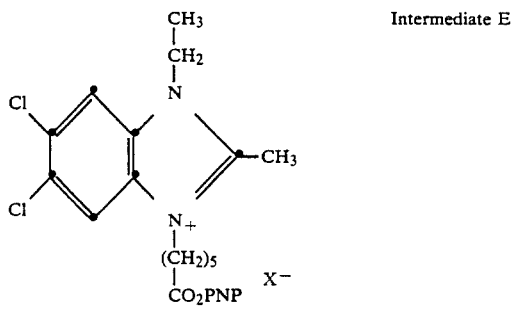

Intermediate E 3-(5-Carboxypentyl)-5,6-dichloro-1-ethyl-2-methylbenzimidazolium iodide (0.50 g, 1.1 mmol) was dissolved in 5 ml pyridine at ambient temperature. To this solution was added p-nitrophenyl trifluoroacetate (1 g, 4 eq., 4.2 mmol) in a single portion as a melt. The solution was stirred 1 hr at ambient temperature and then diluted to 5 times the volume with toluene. The solid precipitate was filtered, washed with toluene and dried in vacuo to give a white solid (0.65 g, 85% yield, m.p. 132°–134° C.). The solid was used without further purification.

Step 3—Preparation of Intermediate F

A compound of the formula:

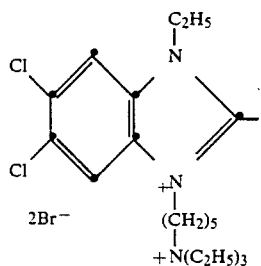

(40 g, 68 mmol), methoxyethanol (28 ml) and ethylisoformanilide (24 ml) were combined and heated 1 hr at 120° C. The solution became red orange. Another aliquot of ethylisoformanilide (24 ml) was added. No change in the NMR (90 MHz) spectrum could be detected by the additional amount of ehtylisoformanilide. The product was oiled out in diethyl ether (Et$_2$O) (1 L). The solvent was decanted, followed by the addition of 1,2-dimethoxyethane (1 L) and H$_2$O (5 ml). The solid product was filtered, washed with Et$_2$O and dried in vacuo; yield 48 g, yellow-orange solid.

This solid (10 g, 14.6 mmol) was combined with pyridine (35 ml) and Ac$_2$O (5 ml). The mixture was heated 1 hr at 60° C. Acetic acid anhydride (Ac$_2$O) (10 ml) was added. The reaction was stirred briefly, cooled and poured into 1 L acetone. The product slowly crystallized overnight in the refrigerator. The solid was filtered, washed with Et$_2$O, and dried in vacuo; yield 8 g, 76% pale pink solid. The NMR spectrum was in accord with the expected structure for intermediate F:

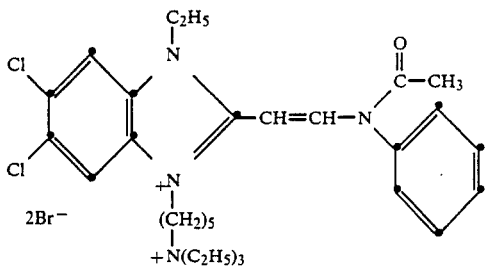

Step 4—Preparation of Dye-Polymer 2

Poly-l-lysine.HCl (MW about 50,000; 1.0 g, 6.1 mmol) was dissolved in 20 ml dimethyl sulfoxide. Intermediate E (3.5 g, 0.98 eq.) and Intermediate D (50 mg, 0.015 eq.) were added, followed by Et$_3$N (2.5 ml, 3 eq.). The yellow-orange solution was stirred at ambient temperature for 1 hr. Another 10 ml dimethyl sulfoxide was added to the reaction followed by the combination of Intermediate F (2.76 g, 3.8 mmol) and 2-(2-acetanilidovinyl)-5,6-dichloro-1,3-diethylbenzimidazolium iodide (1.27 g, 2.4 mmol). Not all the solid would dissolve until addition of tetramethylguanidine (2.1 ml, 3 eq.) upon which a deep red color formed within minutes. The reaction mixture was stirred 2 hr at which time the dye-polymer was precipitated in Et$_2$O (1 L). The solvent was decanted followed by the addition of acetone (500 ml). The red solid was stirred 10 min and filtered. After washing the product with additional acetone, it was air dried and subsequently stored at 0° C.; yield 5.7 g, λ-max 545, 580 (H$_2$O/MeOH).

Synthesis Example 3

Preparation of Dye-Polymer 3

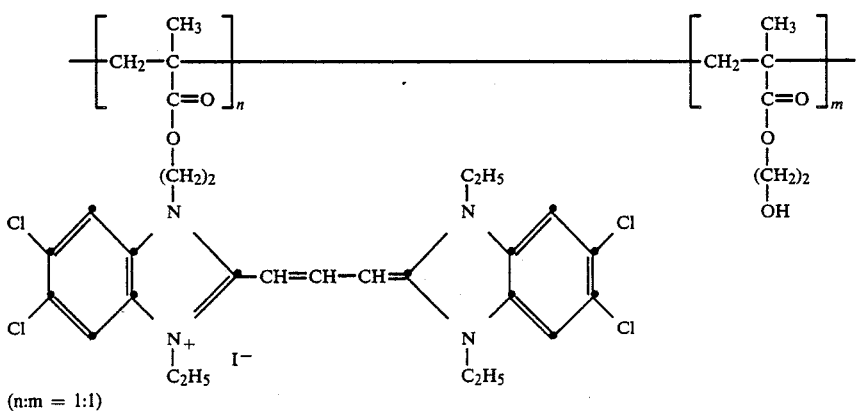

(n:m = 1:1)

Dye-polymer 3 (DP-3 was prepared in a similar manner to DP-1 except that poly(aminoethyl methacrylate-co-hydroxyethyl acrylate) (1:1 mole ratio) prepared in dimethylsulfoxide was used instead of poly-l-lysine.HCl.

EXAMPLE 1

In order to evaluate the spectral sensitizing activity of the J-aggregated dye polymer, a layer of silver bromide evaporated on a paper support was used, coated at approximately 108 mg Ag/ft$^2$. A solution of the dye polymer from Synthesis Example 1 was prepared by dissolving 1 mg of the compound in 0.5 ml of N,N-dimethylformamide with sonication, then diluting the solution to 50 ml with MeOH. A 12"×35 mm strip of the evaporated silver bromide coating was immersed in the J-aggregated dye polymer solution for 15 seconds, then air dried. The coating was then exposed in a small wedge spectrograph for 1/50th of a second at a slit width of 0.5 mm. The exposed coating was then developed for 30 seconds in a developer also containing sodium thiosulfate (4 g/liter) and phenylmercaptotetrazole (0.1 g/liter). The coating was fixed for 2 minutes and washed for 2 minutes.

The result showed an excellent spectral sensitization with a sensitizing peak at 580 nm, typical of J-aggregation for the non-polymeric 5,5',6,6'-tetrachloro1,1',3,3'-tetraethylbenzimidazolocarbocyanine p-toluenesulfonate dye. The results compared to an undyed control are summarized as follows:

|  | Relative Sensitivity | |
| --- | --- | --- |
| Sample | 400 nm | 580 nm |
| Undyed Control | 100 | — |
| Dye Polymer Dyed Coating | 200 | 200 |

Experiments in which the time of immersion of the evaporated silver bromide layer was increased to one minute led to a 4X increase in 580 nm speed with no change in the 400 nm response, but also led to an increase in fog density. Longer soak times led only to increased fog.

EXAMPLE 2

In this example, the concentration of the soaking solution was increased according to the following procedure: 8.2 mg of the dye polymer used in Example 1 was dissolved in 2.5 ml of dimethylformamide, then 7.5 ml of methanol was added. A 12"×35 mm strip of the evaporated silver bromide coating like the one used in Example 1 was immersed for 20 seconds in this polymer dye solution, air dried, exposed for 1/50th of a second in the wedge spectrograph and processed as in Example 1, with the following results.

|  | Relative Sensitivity | |
| --- | --- | --- |
| Sample | 400 nm | 580 nm |
| Dye Polymer Dyed Coating (High concentration) | 100 | 400 |

The sensitivity in the region of spectral sensitization was thus increased without desensitization in the blue region.

EXAMPLE 3

This example evaluated the usefulness of a dye polymer according to the invention for sensitizing degelled silver halide emulsion grains. Degelled 0.4 μm silver bromide cubes deposited by charge control on polyethylene coated paper at 108 mg silver/m$^2$ were used. This coating was evaluated as follows: 10 mg of the dye polymer used in Example 1 was dissolved in 2 ml dimethylformamide, then 18 ml of MeOH was added. A 12"×35 mm strip of the degelled emulsion coating was immersed in this solution, air dried, then exposed to a spectrograph for one second. It was then developed for 2.5 minutes in a developer also containing 200 mg/liter of 5-methylbenzotriazole. Excellent spectral sensitization at 580 nm was obtained as tabulated below.

|  | Relative Sensitivity | |
| --- | --- | --- |
| Sample | 400 nm | 580 nm |
| Undyed Control | 100 | — |
| Dye Polymer Dyed Coating | 100 | 400 |

EXAMPLE 4

As a comparison of the spectral sensitizing activity of the dye polymer used in the previous Examples with its monomeric dye analog, the following experiment was run with the coating of degelled grains described in Example 3.

Separate solutions of the dye polymer and the monomeric dye 2,5,5',6,6'-tetrachloro-1,1',3,3'-tetraethylbenzimidazolocarbocyanine p-toluenesulfonic acid were prepared.

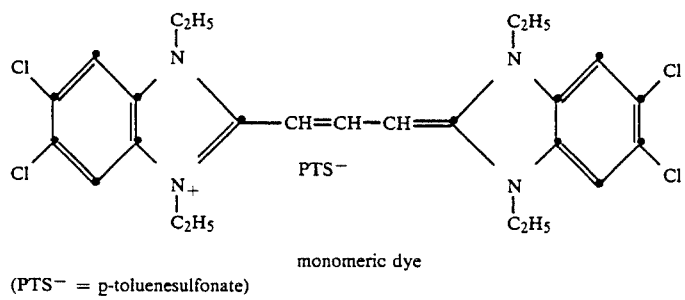

monomeric dye (PTS⁻ = p-toluenesulfonate)

Coatings were prepared as in Example 3 with the following results.

| Sample | Dye Concentration mg/22 ml | Relative Sensitivity 400 nm | Relative Sensitivity 580 nm |
|---|---|---|---|
| Undyed Control | 0 | 100 | — |
| Polymer Dye | 0.1 | 100 | 6 |
| Polymer Dye | 1.0 | 100 | 50 |
| Polymer Dye | 2.5 | 50 | 25 |
| Polymer Dye | 5.0 | 125 | 50 |
| Polymer Dye | 10.0 | 25 | 100 |
| Polymer Dye | 25.0 | 50 | 200 |
| Polymer Dye | 50.0 | 50 | 200 |
| Monomeric Dye | 0.1 | 25 | 100 |
| Monomeric Dye | 1.0 | 12 | 25 |
| Monomeric Dye | 2.5 | 6 | 6 |
| Monomeric Dye | 5.0 | — | — |
| Monomeric Dye | 10.0 | — | — |
| Monomeric Dye | 25.0 | — | — |
| Monomeric Dye | 50.0 | — | — |

From this comparison, it is seen that the best spectrally sensitized speed in the J-aggregate absorption band for the dye polymer is approximately twice as fast as for the monomeric dye alone.

EXAMPLE 5

An additional dye polymer (DP-4) having the structure:

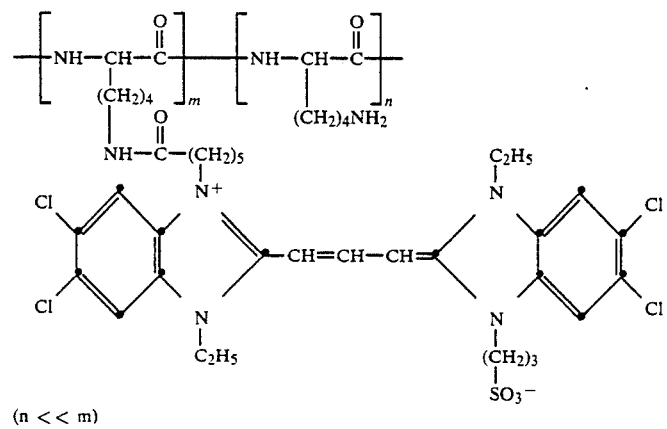

DP-4

(n << m)

was evaluated as follows: 10 mg of the dye-polymer was dissolved in 2 ml of dimethylformamide, then 18.8 ml of MeOH was added. The degelled silver halide coating described in Example 3 was then immersed in the dye solution, air dried, exposed for one second on a Bausch and Lomb spectrograph and developed for 3 minutes in a developer also containing 200 mg per ml of 5-methyl-benzotriazole. The photographic results are shown below.

| Sample | Peak Sensitivity | Spectral Range | Relative Sensitivity 400 nm | Peak Response |
|---|---|---|---|---|
| Undyed Control | 440 | 400–490 | 100 | |
| DP-4 | 570 | 490–590 | 100 | 400 |

The dye-polymer DP-4 clearly exhibited J-aggregation behavior along with spectral sensitization and lack of blue desensitization.

EXAMPLE 6

This example illustrates supersensitization of certain spectral sensitizing dyes by the dye-polymer DP-2, or supersensitization of the dye-polymer by certain dyes, as indicated by comparing the relative quantum efficiencies of emulsion coatings containing the dye or dye-polymer alone and in combination.

The emulsion used in this Example was a 0.2 μm cubic silver bromoiodide, 2.65 mole % iodide, iridium-doped for internal sensitivity as described in U.S. Pat. Nos. 3,690,891 and 3,687,676.

The spectral sensitizing dyes used in the coatings of Example 1 are listed below. Addition to the emulsion was made from methanol solution in each case.

Dye 1: 8-Cyano-3,3'-diethylbenzimidazolothiacarbocyanine

Dye 2: 5-{Bis((1-ethylnaphtho[1,2-d]thiazolin-2-ylidene)methyl)methylene-1,3-bis(2-methoxyethyl)-barbituric acid Dye 3: 5,5'-Dichloro-3,3',9-triethylthiacarbocyanine bromide Dye 4: 8-Cyano-3,3'-diethylbenzimidazolooxacarbocyanine Dye 5: Anhydro-5,5'-dichloro-9-ethyl-3,3'-di(3-sulfobutyl)thiacarbocyanine hydroxide, triethylamine salt Dye 6: Anhydro-5,5'-dichloro-3,9-diethyl-3'-(3-sulfobutyl)thiacarbocyanine hydroxide Dye 7: Anhydro-5-chloro-9-ethyl-5'-phenyl-3'-(3-sulfobutyl)-3-(3-sulfopropyl)oxacarbocyanine hydroxide, triethylamine salt Dye 8: Anhydro-5,5'-dichloro-9-ethyl-3,3'-di(3-sulfopropyl)oxacarbocyanine hydroxide triethylamine salt Dye 9: Anhydro-9-ethyl-5,6-dimethoxy-5'-phenyl-3,3'-bis(3-sulfopropyl)-thiacarbocyanine hydroxide potassiuim salt Dye 10: 3,3'-Diethylthiacyanine p-toluenesulfonate Dye 11: Anhydro-11-(4-ethoxycarbonyl-1-piperazinyl)-10,12-ethylene-3,3'-bis(3-sulfopropyl)thiatricarbocyanine hydroxide, triethylamine salt Dye 12: Anhydro-11-ethyl-1,1'-bis(3-sulfopropyl)-naphth[1,2-d]oxazolocarbocyanine hydroxide, sodium salt Dye 13: 9-Ethyl-5,5'-difluoro-3,3'-bis(3-sulfopropyl)-thiacyanine The coatings were made on a cellulose acetate support at 1.08 g/m² Ag and 4.30 g/m² gelatin. They were hardened with bis(vinylsulfonylmethyl) ether at 2% of the gelatin. DP-2 (400 mg) was dissolved in 4 ml of 2,2,2-trifluoroethanol, followed by the addition of 16 ml methanol and 180 ml water. Portions of the resulting solution were added to the coating melts to provide 2.4 g of dye-polymer/Ag mole. The dyes were added from methanolic solution at a level of 0.8 mmol dye/Ag mole.

Samples of each coating were exposed for 0.5 sec (1.0 sec for control coating No. 1) in a spectral sensitometer to a quartz-halogen light source through a Wratten 80B color correcting filter, diffraction grating with filters to remove second order transmission and superimposed step wedge. The samples were then developed for 2 min at 15° C. in an internal developer as described by Weiss et al, U.S. Pat. No. 3,826,654, having the following composition:

|  | gram |
|---|---|
| 1-Phenyl-3-pyrazolidone | 10.0 |
| Sodium isoascorbate | 40.0 |
| Sodium hydroxide | 30.0 |
| Sodium sulfite | 20.0 |
| 1-Phenyl-4-mercaptotetrazole | 0.25 |
| Potassium bromide | 5.00 |
| Potassium iodide | 0.50 |
| Distilled water to 1 liter |  |

After development, the strips were treated with a conventional stop bath, fixed for 10 min at 20° C., washed and dried. The coatings were evaluated by measuring the speed at 0.3 density above fog at the peak absorptance and the relative quantum efficiency (RQE) calculated using the following formula first published by Spence et al, J. Phys. Colloid Chem. 52, 1090(1948).

$$RQE = \frac{400 \cdot E_{400} \cdot A_{400}}{\lambda \cdot E_\lambda \cdot A_\lambda}$$

where $E_\lambda$ = incident radiant energy of wavelength $\lambda$ in ergs/cm² required to produce a density of 0.3 above fog A = fraction of incident energy absorbed by the emulsion coating $\lambda$ = wavelength of light in nanometers $E_{400}$ and $A_{400}$ are the corresponding quantities for wavelength 400 nm for the same emulsion The resulting relative speeds and calculated RQE values are summarized in Table II.

TABLE II

| Coating Number | Dye | Dye Polymer | Sens. Max. nm | Ref. Max. nm | Relative Speed at λ-max | Relative Speed at 400 nm | Absorptance at λ-max | Absorptance at 400 nm | RQE |
|---|---|---|---|---|---|---|---|---|---|
| 1 | — | — | — | 400 | — | 153 | — | .45 | — |
| 2 | — | I | 570 | 400 | 168 | 145 | .618 | .492 | 0.95 |
| 3 | I | — | 530 | 400 | 140 | 145 | .259 | .48 | 1.25 |
| 4 | II | — | — | — | — | — | — | — | — |
| 5 | III | — | 640 | 400 | 180 | 176 | .380 | .472 | 0.85 |
| 6 | IV | — | 500 | 400 | 122 | 145 | .180 | .495 | 1.30 |
| 7 | V | — | 660 | 400 | 159 | 150 | .460 | .478 | 0.77 |
| 8 | VI | — | 640 | 400 | 175 | 172 | .452 | .48 | 0.71 |
| 9 | VII | — | 550 | 400 | 192 | 148 | .600 | .477 | 1.59 |
| 10 | VIII | — | 550 | 400 | 192 | 150 | .600 | .487 | 1.52 |
| 11 | IX | — | 640 | 400 | 178 | 142 | .39 | .48 | 1.76 |
| 12 | X | — | 450 | 400 | 146 | 152 | .335 | .53 | 1.22 |
| 13 | XI | — | — | — | — | — | — | — | — |
| 14 | XII | — | 570 | 400 | 181 | 146 | .558 | .49 | 1.38 |
| 15 | XIII | — | 640 | 400 | 189 | 155 | .47 | .48 | 1.40 |
| 16 | I | I | 570 | 400 | 169 | 148 | .624 | .51 | 0.93 |
| 17 | II | I | 570 | 400 | 166 | 142 | .62 | .50 | 0.98 |
| 18 | III | I | 580 | 400 | 168 | 151 | .619 | .51 | 0.84 |
|  |  |  | 640 | 400 | 169 | 151 | .422 | .51 | 1.14 |
| 19 | IV | I | 570 | 400 | 171 | 151 | .641 | .52 | 0.90 |
| 20 | V | I | 580 | 400 | 171 | 151 | .61 | .50 | 0.90 |
|  |  |  | 640 | 400 | 180 | 151 | .40 | .50 | 1.52 |
| 21 | VI | I | 580 | 400 | 179 | 156 | .604 | .51 | 1.00 |
|  |  |  | 640 | 400 | 185 | 156 | .644 | .51 | 0.96 |
| 21 | VII | I | 580 | 400 | 180 | 150 | .61 | .50 | 1.13 |
|  |  |  | 550 | 400 | 180 | 150 | .64 | .50 | 1.13 |
| 22 | VIII | I | 570 | 400 | 182 | 155 | .708 | .50 | 0.92 |
|  |  |  | 540 | 400 | 179 | 155 | .60 | .50 | 1.07 |
| 23 | IX | I | 570 | 400 | 172 | 154 | .64 | .51 | 0.85 |
|  |  |  | 630 | 400 | 178 | 154 | .381 | .51 | 1.48 |
| 24 | X | I | 570 | 400 | 173 | 158 | .631 | .558 | 0.88 |

TABLE II-continued

| Coating Number | Dye | Dye Polymer | Sens. Max. nm | Ref. Max. nm | Relative Speed at λ-max | Relative Speed at 400 nm | Absorptance at λ-max | Absorptance at 400 nm | RQE |
|---|---|---|---|---|---|---|---|---|---|
| 25 | XI | I | — | — | — | — | — | — | — |
| 26 | XII | I | 570 | 400 | 182 | 150 | .73 | .50 | 1.00 |
| 27 | XIII | I | 570 | 400 | 175 | 158 | .632 | .508 | 0.83 |
|  |  |  | 620 | 400 | 180 | 158 | .44 | .508 | 1.24 |

Comparison of the relative quantum efficiencies of the sensitizing dyes alone (as measured for their peak sensitizing wavelength) and in combination with DP-2 shows that dyes 3, 5, and 6 were supersensitized by the dye-polymer. Similarly, comparison of the relative quantum efficiency of the dye-polymer alone (as measured for its peak sensitizing wavelength) and in combination with the sensitizing dyes, shows that dyes 6 and 7 supersensitized the dye-polymer. Additionally, many of the dyes, such as dyes 7, 8, 9, and 13, were desensitized by the dye-polymer and some of the dyes, such as dyes 1, 9, and 13, desensitized the dye-polymer.

EXAMPLE 7

Dye-polymer DP-3 was evaluated for photographic performance with a 0.2μ cubic silver bromoiodide (2.65 mole % iodide), sulfur plus gold sensitized emulsion. The dye polymer was dissolved in methanol acidified with HCl and then added to the emulsion, which was coated on a support. The test elements were exposed for 0.1 seconds to a step scale test exposure, processed, and the photographic speed measured. The results are set forth below in Table III.

TABLE III

| DP-3 Level (mg/mole Ag) | Relative Speed at 440 nm | Relative Speed at 570 nm | Comments |
|---|---|---|---|
| 0 | 100 | 0 |  |
| 25 | 100 | 25 | low contrast |
| 400 | 200 | 400 | low contrast |
| 800 | 250 | 1600 | good contrast |
| 1600 | 200 | 1600 | high contrast |

The dye polymer DP-3 spectrally sensitized the emulsion with a J-aggregate peak at 570 nm. The dye polymer produced a strong increase in the blue speed at 440 nm at the 800 mg/mole Ag level and a very high speed spectrally-sensitized response. Increasing the dye level to 1600 mg/mole Ag resulted in only a slight decrease in blue speed and a higher contrast, but equal speed response at 570 nm.

The invention has been described in detail with particular reference to preferred embodiments thereof, but it will be understood that variations and modifications can be effected within the spirit and scope of the invention.

What is claimed is:

1. A photographic composition comprising silver halide spectrally sensitized by a dye polymer comprising a coiled polymer backbone having covalently bonded thereto, in an amount sufficient to J-aggregate, a plurality of cyanine dye units comprising two benzimidazole nuclei.

2. A photographic composition according to claim 1 wherein the polymer backbone is derived from chiral monomers.

3. A photographic composition according to claim 1 wherein the polymer backbone is helically coiled.

4. A photographic composition according to claim 1 wherein the dye polymer has the formula:

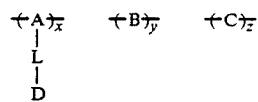

wherein A and B each independently represents chiral polymerized monomers, C is one or more other polymerized monomers, L is a linking group of 4 to 15 carbon atoms, D is one or more dyes capable of spectrally sensitizing silver halide, x represents a mole percent of 10 to 100%, y represents a mole percent of 0 to 50%, and z represents a mole percent of 0 to 50%.

* * * * *